Figure 1:
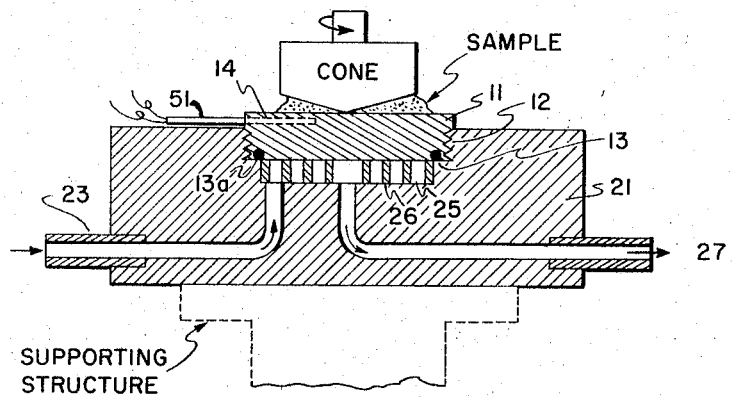

March 7, 1967  DAE SIK KIM  3,307,619

TEMPERATURE CONTROL SYSTEM FOR VISCOSIMETER

Filed Dec. 4, 1964

DAE SIK KIM  Inventor

By

Attorney

United States Patent Office 3,307,619
Patented Mar. 7, 1967

---

3,307,619
TEMPERATURE CONTROL SYSTEM FOR VISCOSIMETER
Dae Sik Kim, Jersey City, N.J., assignor to Esso Research and Engineering Company, a corporation of Delaware
Filed Dec. 4, 1964, Ser. No. 416,092
4 Claims. (Cl. 165—39)

The present invention relates to a temperature control system for a viscosimeter. It is particularly adapted for the fine control of temperature of a plate for a cone-plate viscosimeter.

In the prior art several satisfactory viscosity testing devices have been devised. At present several cone-plate type viscosimeters are commercially available.

In cone-plate viscometry, a sample fluid is placed between a rotating cone and a stationary plate. The viscosity of the sample is evaluated from:

(1) The torque required to maintain the rotation of the cone.
(2) The geometry of the cone.
(3) The rotational speed of the cone.
(4) The distance between the apex of the cone and the plate.

In order to determine a true value for viscosity, it is not only necessary that the above factors be accurately controlled and measured, which has been accomplished quite satisfactorily in some of the better instruments now available, but also that the temperature of the sample itself be accurately controlled. A minute variation in temperature of a sample will produce false results in the test. The temperature of the sample is controlled by the proper control of the plate surface temperature. When viscosity of the sample fluid is high and the rotational speed of the cone is high or is systematically changed, the control of the plate temperature generally cannot be maintained satisfactorily in the cone-plate viscosimeters currently available. A typical example of such an instrument is the Ferranti-Shirley Cone-Plate Viscosimeter which is manufactured by Ferranti, Ltd., of Great Britain.

Another shortcoming commonly found in these instruments is that the thermal elongation (or contraction) of the metal structure which supports the plate can cause changes in the distance between the apex of the cone and the plate, thereby introducing an error in the measurement.

It is accordingly a further and important object of the present invention to:

(1) Maintain the plate temperature within about 0.1° F. or less of its set value, regardless of the sample viscosity and regardless of the speed of rotation.
(2) Improve the accuracy of the system by eliminating the thermally caused dimensional variations of the supporting structure.

The objects named above are accomplished by the use of a temperature controlled plate, control being effected by means of an on-off controller, and means for controlling flow of a temperature adjusting liquid. The latter is preferably in the form of a solenoid control valve. The invention also includes an improved design of the plate. The plate is supported in a block of relatively non-heat conductive material which is not substantially affected by temperature changes, such as a block of a solid polymeric halogenated hydrocarbon polymer, especially a fluorinated polymer such as "Teflon," or other materials having similar properties.

Figure 2:
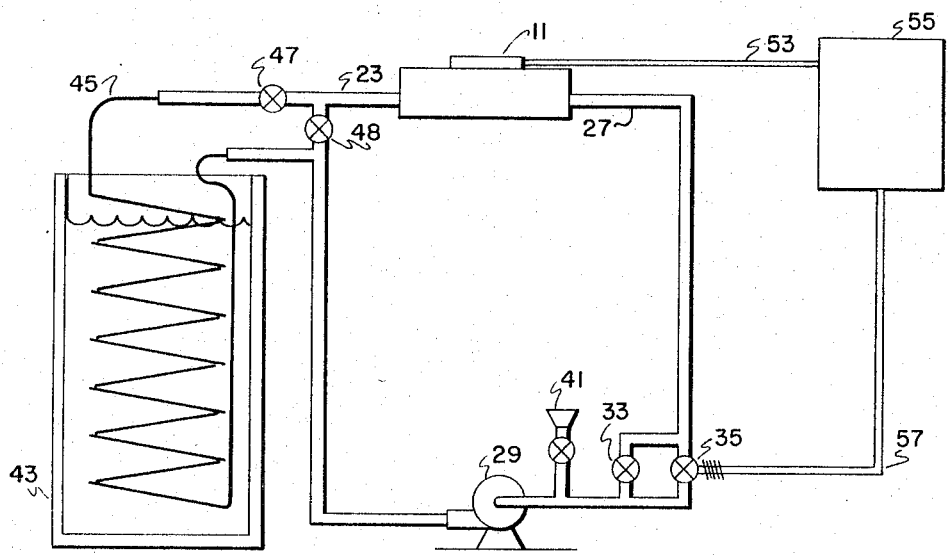

The invention will be better understood by reference to a detailed description of a preferred embodiment thereof. Hence, reference will next be made to the attached drawing wherein:

FIG. 1 is an enlarged view in vertical cross section of the plate and plate supporting structure itself, and FIG. 2 is a schematic view, on a smaller scale, of a system shown in elevation which embodies the plate in circuit with fluid flow and temperature controlling means and mechanism.

Referring first to FIG. 1, the plate 11 per se is a flat topped disc or plug unit made of a good heat conductive metal. Copper or aluminum may be used. Silver, of course, is suitable also but the other metals named are more economical and are satisfactory. The lower side of the plate is threaded, as indicated at 12, so that it can be screwed plug fashion into a supporting block 21. The latter is made of a durable, strong plastic resin, such as "Teflon" or other fluorinated hydrocarbon polymer. It is suitably supported in any appropriate manner by a structural or frame element of the instrument, not shown.

A small hole 14 is drilled into one edge of the plate 11, parallel with and near the top surface, to receive a thermocouple 51. This thermocouple transmits the temperature of the plate through lines 53 to a temperature controller-recorder 55. The latter is of conventional type and per se forms no part of this invention.

The lower face of plate 11 is in direct contact with a cooling cavity 25 in the block 21. The block is arranged to be cooled (it can also be heated, if desired) by circulation of a temperature controlling fluid as will be explained further. In order to insure a fluid-tight seal between plug 11 and block 21 a gasket 13 is provided. This gasket is preferably an O-ring, although other types may be used in most cases, if desired. An annular groove 13a in the lower face of the plate member serves as a seat for the O-ring gasket.

The cooling cavity 25 is a shallow circular cavity into which is fitted a spirally wound metal strip 26 of width equal to the depth of the cavity when the plate 11 is screwed into place. The arrangement is such as to form a spiral passageway 25 for the temperature controlling fluid supplied through an inlet line 23. The fluid enters the spiral path at its periphery, at the left as seen in FIG. 1, and flows to the center of the spiral, then out through outlet line 27. Since the block 21 has a very low thermal conductivity it is essentially unaffected dimension-wise by the temperature of the fluid which flows through it.

By control of the flow of the fluid, the plate 11 is cooled (or warmed) to the desired temperature. It can, of course, be heated, rather than cooled, if the test requires it but, ordinarily, the tests are conducted at low temperatures. As noted above, the plate contains the thermocouple or temperature indicating device 51, and the latter is connected to the temperature recorder-controller 55. The latter controls an electrically operated valve 35 by means of which flow of liquid is regulated. Consequently, temperature in the copper or aluminum plate 11 is controlled as desired. The Teflon (or other plastic) block 21 is largely solid except for the spiral passageway cavity 25. The spiral coil 26 itself is preferably of copper or other suitable heat conductive metal and it is preferably embedded within the center of the plastic block and in direct contact with the copper or aluminum plate 11. The construction is such as to transmit heat very efficiently from the coil to the plate and vice versa.

The temperature recorder controller per se is of a well known type and forms no part of the present invention. By means of a thermostat on this instrument, the controller can be adjusted to any desired position for temperature regulation. Means 41 are provided for adding cooling liquid to the circulating system. By these means, and by adjustment of manually operated valve 33 which can be set for a predetermined flow rate, the normal temperature in the control block 21 may be adjusted as desired. Automatic means are provided in addition to keep the temperature more accurately at desired level than can be accomplished by adjustment of valve 33. Referring to FIG. 2, the circulating coolant is self-contained except for the fresh coolant inlet 41. The coolant from the pump 29 is divided into two streams; one directly to the plate through the valve 48, the other through the copper coil 45 which is submerged in the temperature control material. Preferably the latter is a mixture of Dry Ice and isopropanol contained in an insulated container, e.g., a Thermos jar. The temperature of the fluid flowing to the block 21 is then controlled by proportioning of these two streams, i.e., the chilled stream and the by-pass stream.

The overall flow through the block also is important. The total flow of coolant through the block 21 is controlled by the solenoid operated valve 35 which is actuated, i.e., turned on and off by the temperature recorder-controller. The function of the temperature controller then is to permit the flow of coolant when the temperature of the plate 11 is higher than the set point and to stop the flow when it is lower. The by-pass control 33 permits a manual operation or adjustment.

The thermocouple 51 which is inserted in the hole in plate 11 is connected through wires 53, FIG. 2, to the controller-recorder. The latter is of known type, indicated at 55. The controller also connects through line 57 to the solenoid control valve 35.

The plate 11 which is a good conductor, preferably of copper or aluminum as previously stated, is an efficient device to maintain a stable temperature. It responds very quickly to small temperature changes in the circulating liquid medium beneath. This is important because the temperature of the sample under test should respond very quickly and closely to changes in temperature of the plate. The details of construction of the plate and the box in which it is supported have already been described.

Power is supplied from a conventional source to the temperature recorder controller and through the latter it operates the valve 35 at appropriate times.

It will be obvious that various changes and modifications may be made in the apparatus described above. It is intended by the claims which follow to cover such modifications as would suggest themselves to those skilled in the art, as far as the prior art properly permits.

What is claimed is:

1. In combination with a viscosimeter having a rotatable cone in fluid contact with a sample liquid under test supported upon a fixed metallic plate, the improvement comprising, means for maintaining said plate at a substantially uniform temperature independent of the speed of rotation of said cone and independent of changes in the surrounding ambient temperature, said temperature maintenance means comprising a block of relatively low-heat conductive material having a cavity therein, said cavity including a mouth portion for receiving and mounting said plate and a bottom portion forming a void adjacent the back side of said plate, means for circulating a heat controlling fluid through the void bottom portion of said cavity, and means responsive to the temperature of said plate for controlling the flow of heat controlling fluid through said void bottom portion.

2. The combination of claim 1 including a spirally wound metal strip disposed within said void bottom portion of said cavity in surface contact with the back side of said plate, said strip dividing said void bottom portion into a spiral fluid passageway, said fluid circulating means including inlet conduit means in fluid communication with the outside end of said fluid passageway and discharge conduit means in fluid communication with the inside end of said fluid passageway.

3. The combination of claim 2 including a cooling means, a pump connected between said inlet and discharge conduit means, and means for bypassing a preselected portion of the fluid traveling in said inlet conduit means through said cooling means.

4. The combination of claim 3 wherein said temperature maintenance means includes a thermocouple element within said plate, a temperature controller connected to said thermocouple element, and solenoid valve means in said discharge conduit means responsive to said temperature controller for regulating the supply of fluid flowing to said pump.

References Cited by the Examiner
UNITED STATES PATENTS

| | | | |
|---|---|---|---|
| 2,312,292 | 2/1943 | Tyson | 165—39 |
| 2,501,823 | 3/1950 | Leedom | 165—186 |
| 3,246,841 | 4/1966 | Kling | 165—185 |

ROBERT A. O'LEARY, *Primary Examiner.*

CHARLES SUKALO, *Examiner.*